(12) United States Patent
Gusler et al.

(10) Patent No.: US 6,717,592 B2
(45) Date of Patent: Apr. 6, 2004

(54) NOTIFICATION PROCESSING SYSTEM

(75) Inventors: Carl Phillip Gusler, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 09/731,649

(22) Filed: Dec. 7, 2000

(65) Prior Publication Data
US 2002/0073050 A1 Jun. 13, 2002

(51) Int. Cl.⁷ .................................................. G09G 5/00
(52) U.S. Cl. ...................... 345/738; 345/741; 345/744; 705/42
(58) Field of Search ................................. 345/738, 741, 345/744, 745, 746, 747, 777; 705/26, 27, 30, 33, 34, 35, 38, 39, 40, 42

(56) References Cited

U.S. PATENT DOCUMENTS

| | | | |
|---|---|---|---|
| 4,643,453 A | 2/1987 | Shapiro et al. | 283/73 |
| 6,014,634 A | 1/2000 | Scroggie et al. | 705/14 |
| 6,029,154 A | 2/2000 | Pettitt | 705/44 |
| 6,095,413 A | 8/2000 | Tetro et al. | 235/380 |
| 6,101,531 A | * 8/2000 | Eggleston et al. | 709/206 |
| 6,157,924 A | * 12/2000 | Austin | 707/10 |
| 6,327,574 B1 | * 12/2001 | Kramer et al. | 705/14 |

* cited by examiner

*Primary Examiner*—Ba Huynh
(74) *Attorney, Agent, or Firm*—David A. Mims, Jr.; Robert V. Wilder

(57) ABSTRACT

Account transaction reports from a bank card account for example, are assembled and sent by electronic mail or "email" to the email address of the account owner. An input screen is presented to allow the user to input the user preferences with regard to the substance of the report. The account owner is enabled to approve or disapprove each of the listed charges and return a user-approved marked-up report showing which of the listed transactions have been approved and/or disapproved by the user. The user-approved listing is returned to the account administrator and a printed acknowledgement of receipt of the user-approved listing is returned to the user by electronic mail.

23 Claims, 4 Drawing Sheets

CUSTOMER REPORT OF TRANSACTIONS

| DATE | TRANSACTION | AMOUNT CHARGED | APPROVE | DO NOT APPROVE |
|---|---|---|---|---|
| 11/1/00 | DEPARTMENT STORE A | $89.67 | ☒ | ☐ |
| 11/1/00 | DEPARTMENT STORE B | $334.58 | ☒ | ☐ |
| 11/1/00 | GASOLINE | $25.00 | ☒ | ☐ |
| 11/1/00 | DEPARTMENT STORE B | $158.75 | ☐ | ☒ |

PRINT REPORT AS RECEIVED
PRINT AND RETURN DISAPPROVAL REPORT TO BANK AND EXIT
EXIT REPORT WITHOUT CHANGE
CARD HAS BEEN LOST OR STOLEN. PLEASE DO NOT ACCEPT FUTURE CHARGES

NOTIFICATION PROCESSING SYSTEM

RELATED APPLICATIONS

Subject matter disclosed and not claimed herein is disclosed and claimed in related co-pending application Ser. No. 09/731,627, which is assigned to the assignee of the present application and included herein by reference.

FIELD OF THE INVENTION

The present invention relates generally to information processing systems and more particularly to a methodology and implementation for processing account charges.

BACKGROUND OF THE INVENTION

The use of account charge cards is continuing to expand to the extent that a charge card may be used today to accomplish almost any kind of transaction. Recently, automatic teller machine (ATM) bank account cards and so-called "debit" account cards are also increasing in use and popularity. The availability and increasing use of charge cards has made it much easier and faster to purchase anything that a buyer may wish to purchase. The expansion of the World Wide Web (WWW) and the Internet have also contributed to the rapid increase in use of transaction cards and also the sheer number purchasing transactions which may occur during any given period of time for every account customer or card holder.

However, with the increasing number of transactions being made on a daily basis, it has become extremely difficult for the account holder to keep track of all of the purchases made during a billing cycle. Moreover, with more and more transactions being made, there is a corresponding increase in the number of fraudulent transactions. Generally, an account holder does not see a listing of charges from the bank account or other charge card administrator until several weeks after a transaction has occurred. Because of the relatively long time delays between the transaction and the reporting of the transaction to the customer, when a card is lost or stolen, many fraudulent charges may be made before the customer realizes that the card is missing and many fraudulent purchasing transactions occur that could have been avoided. Further, if there are fraudulent or incorrect charges that the customer wishes to dispute, the customer may call the bank to notify the bank of the incorrect charges. This process normally takes an appreciable amount of time and much follow-up to insure that the disputed charges have been recorded and, eventually, that the disputed charges are corrected. Further, the customer does not always have a record of having disputed the charges to the bank or other card administrator in a timely manner.

Thus, there is a need for an improved charge processing system which may be implemented to help alleviate the foregoing shortcomings in account processing techniques.

SUMMARY OF THE INVENTION

A method and implementing computer system are provided in which account transaction records are assembled and communicated on a periodic basis. Users are enabled to provide user preferences including the frequency with which the reports are assembled and made known to the user, as well as which particular charges to report in terms of the type and/or amount of the charges. In an exemplary embodiment, account transaction reports from a bank card account are assembled and sent by electronic mail or "email" to the email address of the account owner. An input screen is presented to allow the user to input the user preferences with regard to the substance of the report.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
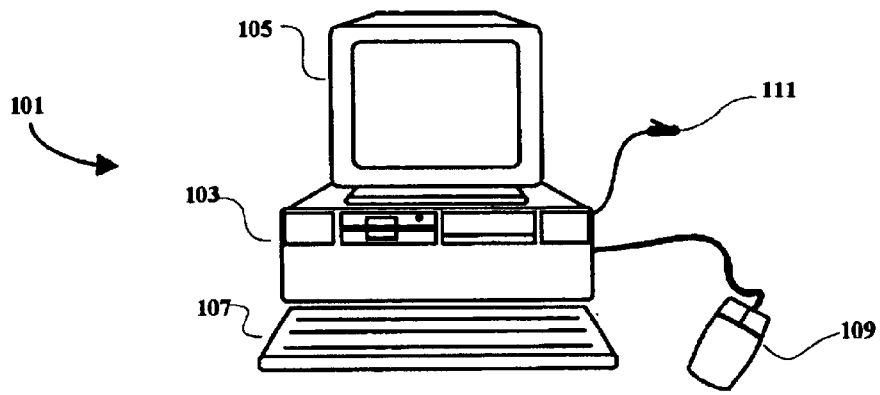
FIG. 1 is a diagram of a computer system in which the present invention may be implemented.

With reference to FIG. 1, the various methods discussed herein may be implemented within a computer network including a computer terminal 101, which may comprise either a workstation or a PC for example. In general, an implementing computer system may include computers configured with a plurality of processors in a multi-bus system in a network of similar systems. However, since the workstation or computer terminal 101 implementing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer terminal 101. The computer terminal 101 also includes a monitor unit 105, a keyboard 107 and a mouse or pointing device 109, which are all interconnected with the computer terminal illustrated. Also shown is a connector 111 which is arranged for connecting a modem within the computer terminal to a communication line such as a telephone line in the present example. The present invention may also be implemented in a cellular system.

Figure 2:
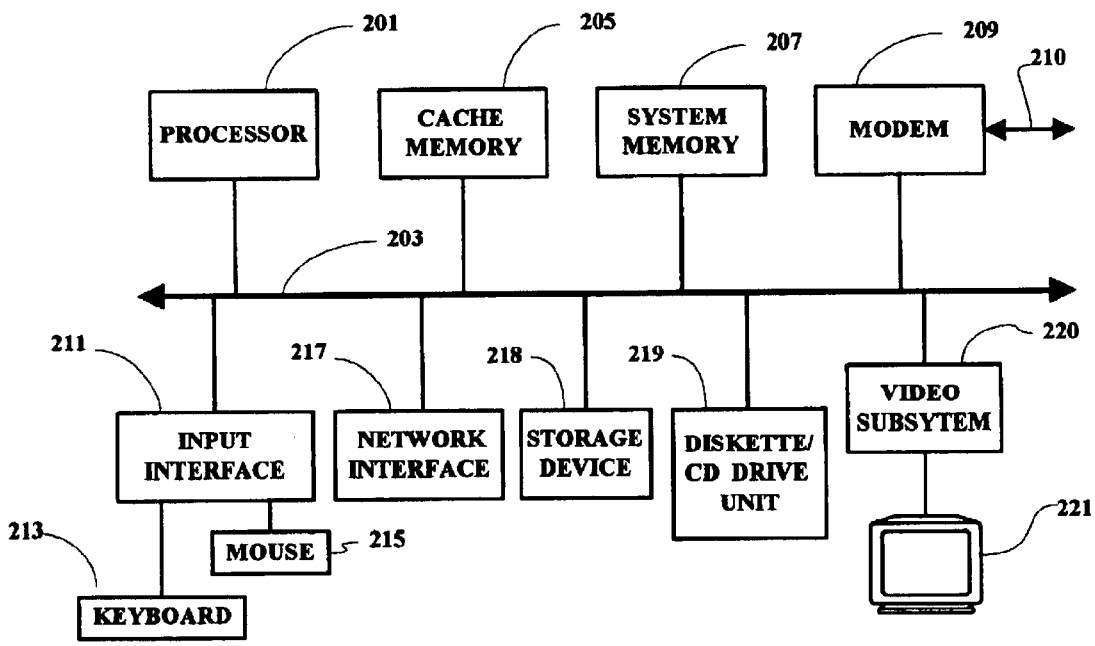
FIG. 2 is a simplified schematic diagram showing selected components and subsystems of the computer system illustrated in FIG. 1.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with a network server. The network may comprise a direct connection through an Internet Service Provider (ISP) to a server on the World Wide Web (WWW) or the network connection may be to a local area network server for further connection to the WWW.

The system bus 203 is also connected through an input interface circuit 211 to a keyboard 213 and a mouse or pointing device 215. The bus 203 may also be coupled through a hard-wired network interface subsystem 217. A diskette or CD drive unit 219 is also shown as being coupled to the bus 203. A video subsystem 220, which may include a graphics subsystem, is connected to a display device 221. A storage device 218, which may comprise a hard drive unit, is also coupled to the bus 203. The diskette/CD drive unit provides a means by which individual programs may be loaded on to the hard drive, or accessed directly, for selective execution by the computer terminal 101. As is well known, program media containing application programs represented by magnetic or other indicia on the medium, may be read from the drive unit, and the computer system is selectively operable to read such indicia and create program signals. Such program signals are selectively effective to cause the computer system to present displays on the screen of a display device and respond to user inputs in accordance with the functional flow of the application program on the medium or as loaded into memory.

In running an Internet access program or browser program on the computer terminal 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described. As a program is running, either a portion of the program or the entire program may be loaded into the system memory 207 and/or the system cache memory 205.

Depending on specific program design, the system may store any information accessed from a database in the storage unit 218, the cache memory 205, the system memory 207 or directly from a diskette or CD loaded into the medium drive unit 219. Assuming a user has started-up the system, and is actively running a browser program for example, from memory, a series of screens will be displayed to the user on the display device 221. Each screen typically has one or more selections for the user to make in navigating through the program. In general, a user will make selections from a home page display screen using the keyboard 213 or the mouse or pointer device 215. The selections made by the user will determine "where" the user "goes", i.e. to what "site" or "webpage", and also, in some cases, the communications link or the path taken to get to the WWW site selected.

Figure 3:
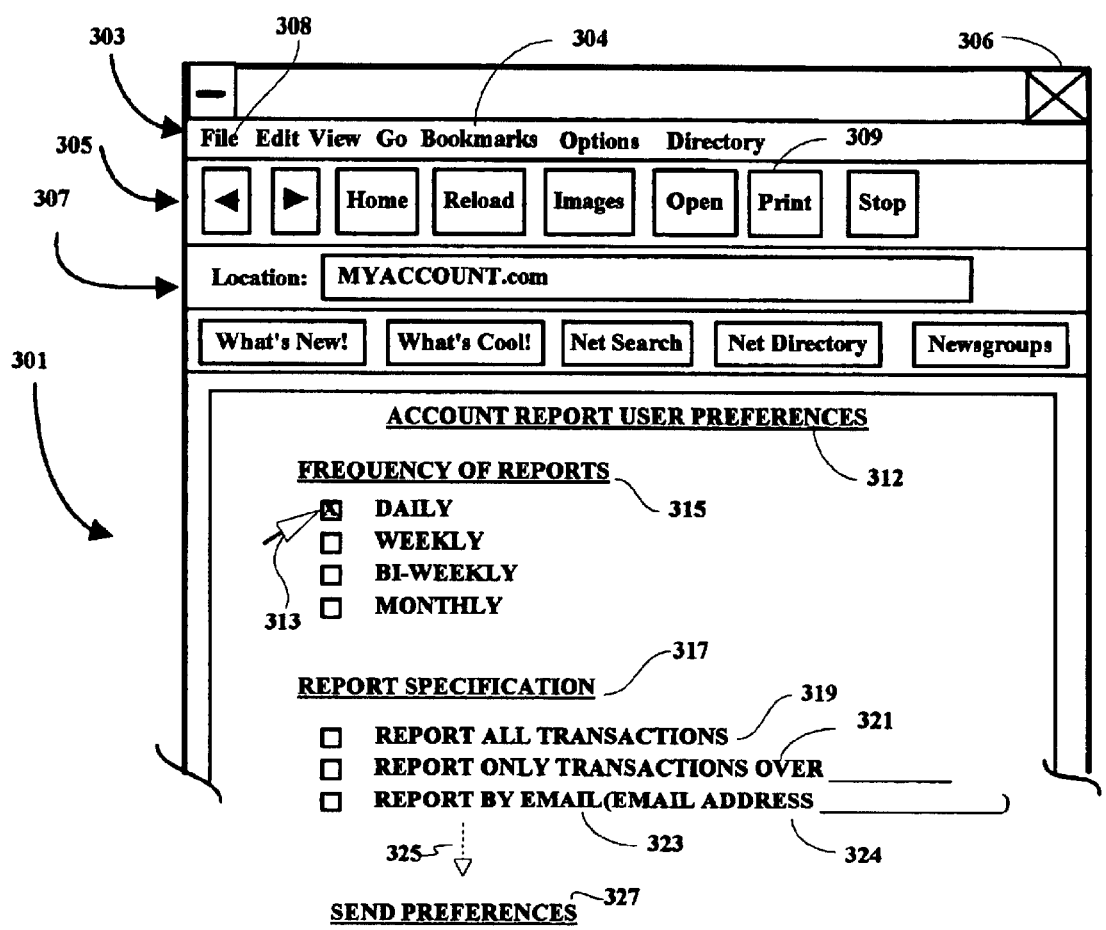
FIG. 3 is exemplary illustration of a webpage which may be used to enable a user to input user preferences relative to an account report.

FIG. 3 illustrates a browser program screen display 301. The browser screen generally includes a first row 303 of function buttons. The function buttons may be selected by a user with a pointer device using a "point-and-click" methodology which is well known. A user may select a "File" button 308 or a "Bookmarks" selection 304. Another row 305 may be displayed to help a user quickly move through documents, sites, or pages in a browser application. A user may terminate any session with a web page by actuating a terminate button 306. An address or "location" section 307 enables a user to key-in, and also displays the name of, a WWW address of a site to be, or being, visited. In general, any of the illustrated items may be selected through a "point and click" methodology associated with the mouse device 215, and a cursor or pointer 320 visible on the display screen. For example, a download of data from a remote site may be immediately terminated during the transmission by pointing to the "Stop" button and clicking on a designated mouse button. Similarly, the "Back" and "Forward" buttons may be used to return to the last screen display or go forward to the next screen display, respectively.

In the exemplary screen illustrated in FIG. 3, the user has accessed the location of a web site ("MYACCOUNT.com") of an account administrator such as a bank account or charge card account which is owned by the user. As shown, a screen is presented to the user which enables the user to input user preferences 312 with regard to an account report. In the illustrated example, one section 315 of the user preference input screen enable a user to specify the frequency of the reports. If, using a mouse or other pointer device, the user points to and clicks a screen pointer 313 on the block next to the "DAILY" selection as shown, the user has indicated that a daily report of charges made to his account is desired. Similarly, a user may select other frequencies such as weekly, biweekly or monthly reports in the example.

In another section 317, the user may select other user preferences with regard to a periodic report of charges made against the user account with the bank issuing a charge card for example. In the example, the user may select to have all transactions reported 319, or only to have transactions 321 over a designated amount reported. The reports may be made merely by posting the information on an account web page to be accessed by the user. In a preferred embodiment, the user is enabled to designate 323 that the reports are to be sent to the user via email, and the user is able to input the particular email address 324 to which the user wishes to have the reports submitted. Other preferences 325 may also be specified by the user. When the user has provided the user's report preferences, the user is able to point and click on the hypertext "SEND PREFERENCES" 327 to send the preferences to the account server, or the user may terminate the session without input by actuating the terminate block 306. When the user preferences are sent to the account server, they are stored by the server and are referenced and used in providing periodic account transaction reports to the user by the designated means. In this way, a user is able to view transactions in a prompt and efficient manner to insure that the posted transactions are accurate.

Figures 4, 5:
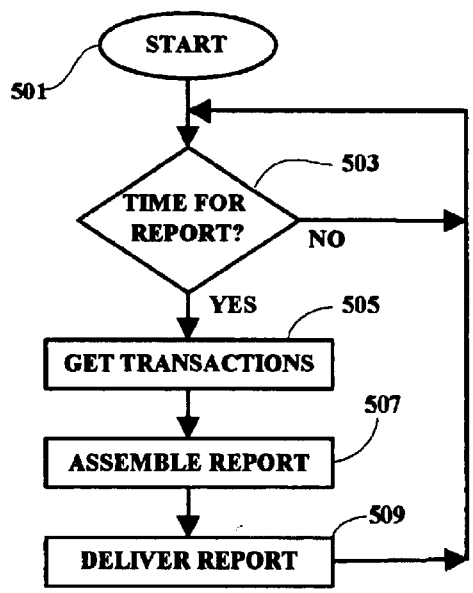
FIG. 4 is an illustration showing an example of a transaction report presented on a user display device.
FIG. 5 is an exemplary flow chart illustrating an operational sequence in one exemplary embodiment of the methodology disclosed herein.

In the exemplary report 401 illustrated in FIG. 4, a daily report has been sent to a user via the designated user's email address. The report 401 includes a series of listings which show various transactions 405 that have posted to the user's charge account during the indicated date 403. The report also shows the amount of the charge 407. The display also provides means for the user to either approve 409 or disapprove 411 of each of the charges in the listing. A user may, for example, use the pointer 413 to approve all of the listed charges except one, which is not approved by the user. The report in the example is sent to the user on the day following the posting of the charges so that both the user and the bank are able to identify potentially incorrect charges at a very early point in time and significantly reduce the potential for fraudulent or otherwise invalid charges. This early detection is enabled through the use of an automated email report and response as herein described.

In the example shown in FIG. 4, by actuating the appropriate hypertext, the user is able to print the report 415 to a printer to provide a written record of the charges. Similarly, the user may print the marked-up report (i.e. the report showing the approved and disapproved blocks), and return the marked-up report 417 to the bank server, and exit the program. The user may also merely exit the report 419 without mark-up. The report may also include a quick and easy way to notify the bank of a lost or stolen credit, debit or ATM card by clicking on the designated hypertext 422. Other user preference options may also be included for selection by the user.

As shown in the flow chart of FIG. 5, a bank server starts the methodology 501 by making a determination as to whether or not it is time 503 for a periodic report to a user or account owner. That determination is made with reference to the user input which specified the frequency of reports as discussed in connection with FIG. 3. The determination can be made, for example, by running the appropriate code at the beginning of or at the end of every day. Next, if it is time for a periodic transaction report to the user, the transactions are retrieved 505 and the report is assembled 507 in accordance with the input provided by the user in the Report Specification 317. Next, the report is delivered 509 and the process returns to await the next reporting time 503. The report may be delivered in several ways. The report may be delivered by posting the report to a web site which may be accessed by the user, or by sending an email to the user which contains the report within the email.

Figure 6:
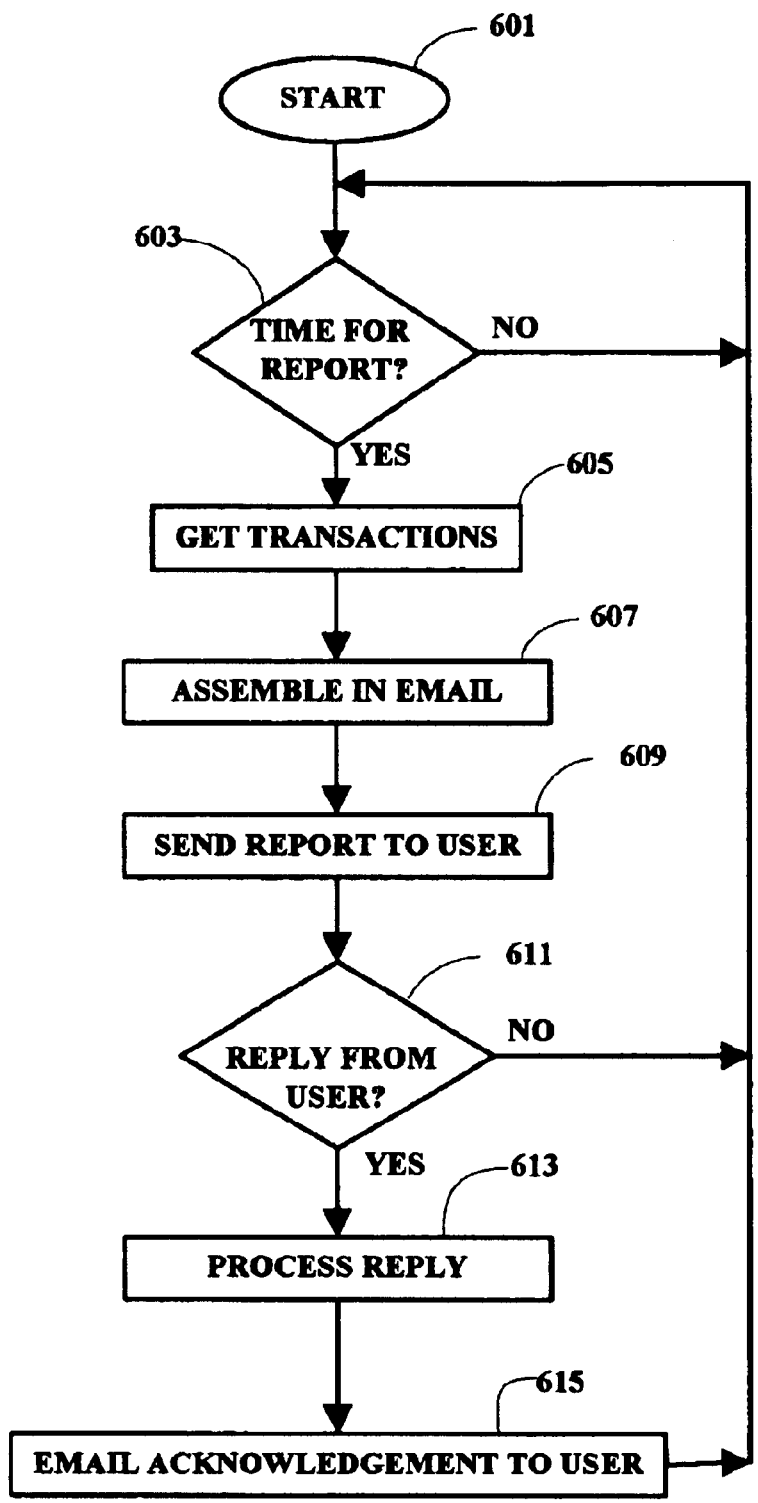
FIG. 6 is a flow chart illustrating another exemplary embodiment of the methodology disclosed herein.

FIG. 6 illustrates an email report delivery in more detail. As shown, the processing begins 601 with the determination that the time has come for the bank server, for example, to deliver a report 603 to a user or customer as specified in a user preference file. Next, the transactions which have occurred during the reporting period are retrieved 605 and assembled in email format 607. The report is then emailed to the user 609 using the email address provided by the user 324. Next, if no reply is returned to the bank from the user 611 the process returns to await the next time a report is due 603. If, however, the user checks off the blocks as shown in FIG. 4 and returns the marked-up report to the bank 611, the reply is processed by the bank or other institution administering the user's account, and an email acknowledgement is returned to the user 615. The process then returns to await the next reporting time 603. The email acknowledgement 615 from the bank acknowledges the user's dispute of the indicated charge (FIG. 4) and gives the user a record of the user's timely disapproval of the charges so marked. The bank is thereby quickly able to process the dispute and resolve the matter in a timely fashion. It is noted that security provisions may also be added and included in the processing to insure confidentiality of the communications between the bank and the user.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a charge account report for periodic display to a user, said method comprising:

selectively presenting a user preference screen on a user display device;

enabling said user to define a customized report display by selecting user preferences with regard to variable characteristics of said charge account report, wherein one of said user preferences represents a minimum transaction amount to be included in said customized report display; and periodically assembling charge account transaction data to include in said customized report display.

2. The method as set forth in claim 1 and further including making said customized report display available to said user.

3. The method as set forth in claim 2 wherein said customized report display is made available for access from an account server site through a network connection.

4. The method as set forth in claim 3 wherein said customized report display is made available by sending a report-related email to said user.

5. The method as set forth in claim 1 wherein one of said user preferences is a frequency with which said customized report is made available.

6. The method as set forth in claim 1 wherein one of said user preferences represents a selection to include all transactions which have occurred since a prior report.

7. The method as set forth in claim 1 and further including sending said customized report display to said user display device by email.

8. The method as set forth in claim 7 and further including sending said customized report display to said user display device as an attachment to said email.

9. The method as set forth in claim 7 and further including sending said customized report display to said user display device as an integral portion of said email.

10. The method as set forth in claim 7 wherein said customized report display is sent to said user automatically by an account server through a network connection.

11. The method as set forth in claim 7 wherein said customized report display is encrypted prior to sending said email, said customized report display being de-encrypted by said user after receiving said email.

12. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to enable a processing of a charge account report for periodic display of said report to a user, said program signals being selectively operable to accomplish the steps of:

selectively presenting a user preference screen on a user display device;

enabling said user to define a customized report display by selecting user preferences with regard to variable characteristics of said charge account report, wherein one of said user preferences represents a minimum transaction amount to be included in said customized report display; and periodically assembling charge account transaction data to include in said customized report display.

13. The medium as set forth in claim 12 wherein said program signals are further effective for making said customized report display available to said user.

14. The medium as set forth in claim 13 wherein said customized report display is made available for access from an account server site through a network connection.

15. The medium as set forth in claim 14 wherein said customized report display is made available by sending a report-related email to said user.

16. The medium as set forth in claim 12 wherein one of said user preferences is a frequency with which said customized report is made available.

17. The medium as set forth in claim 12 wherein one of said user preferences represents a selection to include all transactions which have occurred since a prior report.

18. The medium as set forth in claim 12 wherein said program signals are further effective for:

sending said customized report display to said user display device by email.

19. The medium as set forth in claim 18 wherein said program signals are further effective for sending said customized report display to said user display device as an attachment to said email.

20. The medium as set forth in claim 18 wherein said program signals are further effective for sending said customized report display to said user display device as an integral portion of said email.

21. The medium as set forth in claim 18 wherein said customized report display is sent to said user automatically by an account server through a network connection.

22. The medium as set forth in claim 18 wherein said customized report display is encrypted prior to sending said email, said customized report display being de-encrypted by said user after receiving said email.

23. A processing system comprising:

a user terminal, said user terminal further including a system bus, a CPU device connected to said system bus, a memory device connected to said system bus, an input device connected to said system bus, said input device being arranged to enable user input to said user terminal, and a user display device connected to said system bus; and a server terminal, said server terminal being selectively operable for being connected to said user terminal, said processing system being selectively operable for enabling a processing of a charge account report for periodic display of said report on said user display device, said processing comprising selectively presenting a user preference screen on said user display device for enabling said user to define a customized report display by selecting user preferences with regard to variable characteristics of said charge account report, wherein one of said user preferences represents a minimum transaction amount to be included in said customized report display, said processing further including periodically assembling charge account transaction data to include in said customized report display.

* * * * *